United States Patent [19]

Manganaro et al.

[11] Patent Number: 5,155,144
[45] Date of Patent: Oct. 13, 1992

[54] POLYSACCHARIDE-BASED POROUS SHEETS

[76] Inventors: James L. Manganaro, 44 Dodds La., Princeton, N.J. 08540; Bruce S. Goldberg, 48 Ravona St., Clifton, N.J. 07015; George E. Raynor, Jr., 34 Church Rd., Media, Pa. 19063; Charles A. Gray, 83 Philip Dr., Princeton, N.J. 08540

[21] Appl. No.: 605,582

[22] Filed: Oct. 29, 1990

[51] Int. Cl.$^5$ .................. H01M 2/00; H01M 10/50; H01M 2/16

[52] U.S. Cl. .................. 523/134; 521/87; 521/64; 521/61; 521/82; 521/91; 521/92; 429/62; 429/102; 429/104; 429/145

[58] Field of Search .................. 523/134; 524/87, 64, 524/61, 82, 91, 92; 429/62, 145, 102, 104

[56] References Cited

U.S. PATENT DOCUMENTS

| | | | |
|---|---|---|---|
| Re. 33,093 | 10/1989 | Schiraldi et al. | 424/449 |
| 1,132,183 | 3/1915 | Hidden | 523/134 |
| 1,567,747 | 12/1925 | Norris | 523/134 |
| 2,112,529 | 3/1938 | Hazell | 523/134 |
| 2,624,768 | 1/1953 | Toulmin | 523/134 |
| 3,766,106 | 10/1973 | Yurimoto et al. | 523/134 |
| 3,862,030 | 1/1975 | Goldberg | 210/24 |
| 3,922,432 | 11/1975 | Renn | 428/327 |
| 4,076,656 | 2/1978 | White et al. | 521/87 |
| 4,102,746 | 7/1978 | Goldberg | 435/96 |
| 4,169,014 | 9/1979 | Goldberg | 435/182 |
| 4,373,519 | 2/1983 | Errede et al. | 128/156 |
| 4,385,991 | 5/1983 | Rosevear et al. | 210/635 |
| 4,460,642 | 7/1984 | Errede et al. | 428/283 |
| 4,565,663 | 1/1986 | Errede et al. | 264/120 |
| 4,585,797 | 4/1986 | Cioca | 514/773 |
| 4,663,163 | 5/1987 | Hou et al. | 424/101 |
| 4,705,809 | 11/1987 | Dighton et al. | 521/62 |
| 4,722,898 | 2/1988 | Errede et al. | 435/182 |
| 4,743,373 | 5/1988 | Rai et al. | 210/198 |
| 4,957,943 | 9/1990 | McAllister et al. | 521/64 |

FOREIGN PATENT DOCUMENTS

| | | |
|---|---|---|
| 601506 | 5/1948 | United Kingdom . |
| 1600241 | 3/1978 | United Kingdom . |

OTHER PUBLICATIONS

Affinity Chromatography, pp. 36–37 (Wm. H. Scouten, John Wiley & Sons) 1981.

"A Unique Flow Through Microporous Chromatography Device for Protein Purification", Goldberg et al., AIChE Biotechnology Conference, N.Y. Table I, (Nov. 1987).

FMC BioProducts 1989 Price List, p. 11.

Proc. Natl. Acad. Sci. USA, vol. 76, No. 2, pp. 615–619 (1979).

*Primary Examiner*—Ronald W. Griffin

[57] ABSTRACT

A microporous sheet comprising a polymeric matrix having a liquid insoluble, particulate, activated polysaccharide media dispersed therein; use of the sheet in affinity chromatography or ion-exchange chromatography or as a biochemical reactor or battery separator; processes for manufacturing the sheet; apparatus containing the microporous sheet as its active element; and methods for using such sheet.

22 Claims, 1 Drawing Sheet

POLYSACCHGARIDE-BASED POROUS SHEETS

BACKGROUND OF THE INVENTION

1. Field of the Invention

This invention relates to a porous sheet material useful for the affinity chromatographic and/or ion-exchange chromatographic separation and purification of biological substances, as a biochemical reactor, and as a battery separator; processes for manufacturing such sheet material; methods for using such material; and apparatus in which such material is employed.

2. Statement of Related Art

Recent advances in biochemistry, molecular biology and like disciplines have required faster and more accurate techniques in the recovery, purification and analysis of small amounts of biological substances such as DNA segments and proteins. Methods such as ion-exchange, affinity, and other chromatographic separation processes all have required as a necessary step the separation and recovery of these biological materials from gels, broths, or like media, conventionally using either various types of adsorption columns such as ion exchange columns, affinity-binding techniques and the like. More recently, an alternate method for recovering DNA or proteins from gels comprising electrophoretic separation has been provided which involves dissolving the desired gel slice in chaotropic salts, such as sodium iodide (NaI), followed by selective binding of the DNA to glass beads, i.e. a suspension of silica matrix in water, which is then subjected to centrifugation. Proc. Natl. Acad. Sci. USA, 76 No. 2, pp. 615-619 (1979).

U.S. Pat. No. 3,862,030 discloses a material useful as a microporous fluid-permeable filter medium comprising a polymeric resinous matrix such as polyvinyl chloride (PVC) having an inorganic filler dispersed throughout, in particular silica. U.S. Pat. Nos. 4,102,746, and 4,169,014, disclose like compositions in which the silica has been activated by the addition of binding groups, i.e. active ligand sites.

U.S. Pat. No. 3,922,432 teaches a hydrated gel sheet having incorporated therein or bonded thereto a layer of particles having an affinity for selected materials to be separated from a mixture containing the same. Included among these affinity-binding particles are such materials as hydroxypropylcellulose, diethylaminoethyl (DEAE) cellulose, microcrystalline cellulose and the like. This composition is a non-porous material which permits no flow-through of liquids, only surface contact with the scored sheet, as described therein.

Moreover, as taught in Affinity Chromatography, pp. 36-37, [Wm. H. Scouten, John Wiley and Sons, N. Y. publ. (1981)] there are two problems associated with the use of cellulose as an affinity-binding matrix: (1) it is fibrous in nature, and thus easily clogged; more significantly, it is easily compressed, even at moderate pressures; and (2) it is often contaminated with a wide variety of impurities, which must be removed before use.

U.S. Pat. Nos. 4,373,519; 4,460,642; 4,565,663; and 4,722,898, each disclose a composite sheet material comprised of a polytetrafluoroethylene matrix having enmeshed therein hydrophilic absorptive particles such as cellulose, dextran, clay or the like for use as a wound dressing or as a chromatographic material.

Similarly, U.S. Pat. No. 4,705,809 describes a porous thermoplastic article for use as a filter, battery separator, or film, in which the thermoplastic comprises a non-water soluble thermoplastic compound and water-soluble cellulose, hydroxyalkyl cellulose or derivatives thereof, admixed therein. The cellulose employed in this patent is intentionally water-soluble, e.g. a hydroxycellulose compound, and is substantially washed out of the matrix to create the desired pores, thus leaving only a small residue of cellulose in the final composition.

U.S. Pat. No. 4,663,163 describes a swellable, modified polysaccharide material comprising a fibrous polysaccharide which is chemically bonded covalently to a polymerizable compound which contains a variety of chemical groups possessing both covalent bonding and chemically binding functions, i.e., wherein the latter are ionizable, thereby forming a chemically unitary composition useful for chromatoqraphic procedures. U.S. Pat. No. 4,743,373 describes a complex chromatographic device which can employ, inter alia, the swellable, fibrous material of U.S. Pat. No. 4,663,163.

U.S. Pat. No. 4,385,991, as well as corresponding British Patent 1,600,241, defines deformable, ampholytic gels containing polysaccharides, wherein said gels are impregnated in discrete, particulate materials such as diatomaceous earth or the like for use in chromatographic separations, etc.

The publication "A Unique Flow Through Microporous Chromatography Device for Protein Purification", Goldberg et al., AICHE Biotechnology Conference, N.Y., Table I, (Nov., 1987), teaches that it is conventional to use such materials as a diethylaminoethyl-activated cellulose alone, or a microporous polyvinyl chloride (PVC) sheet containing silica reacted with polyethyleneimine (PEI), for use in ion exchange chromatography for binding and purifying proteins.

FMC Corporation, Philadelphia, Pa., under the ACTI-DISK and ACTI-MOD trademarks, sells products containing microporous PVC sheeting having silica particles dispersed throughout, which particles may be activated for anion/cation exchange chromatography with polyethyleneimine (PEI), sulfopropyl (SP) or carboxymethyl (CM) and for affinity chromatography with glutanaldehyde (GTA), r Protein A, or r Protein G. [FMC BioProducts 1989 Price List, p. 11].

SUMMARY OF THE INVENTION

The present invention provides a composition of matter which is a porous sheet material containing a selective-binding compound for use as the active element in liquid affinity and ion-exchange chromatography apparatus, as a bioreactor, and as a battery separator. The porous sheet comprises a polymeric resinous matrix having fixedly dispersed therein an organic medium in particulate or fibrillated form comprised of specific activated polysaccharides, said sheet containing a network of pores formed throughout the sheet. When used in chromatography it is capable of selectively and releasably binding targeted biological materials such as proteins, nucleic acids, or the like from liquid mixtures containing the same. When used as a bioreactor, it is capable of supporting biologically reactive substances or organisms bound to the selective-binding compound, for example enzymes or enzyme-generating bacteria. When used as a battery separator, it is capable of separating the anodes and cathodes within a storage battery.

Polymers which may suitably be employed as matrices in the composition of this invention include polyvinyl chloride, or copolymers of vinyl chloride and other monomers, or latexes thereof, as described below; cellulose acetate polymers; polysulfones; polyolefins; and the like, of which polyvinyl chloride is preferred.

The activated polysaccharide organic medium which may be employed herein comprises particulate, releasably-binding, liquid (especially water) -media insoluble compounds selected from activated: agar, agarose, alginate, carrageenan, cellulose, chitosan, konjac, or mixtures thereof, which, when fixedly dispersed in the aforedescribed matrices, form effective selective-binding sheets for purposes of this invention. Of the above activated polysaccharides, activated cellulose, activated agarose, or mixtures thereof, are preferred, and most particularly the cellulose derivatives. Further reference in this specification to agarose and/or cellulose may be considered as equally applicable to the foregoing polysaccharides, unless otherwise stated.

That not all polysaccharides are useful in the compositions of this invention is demonstrated in that the polysaccharide dextran, and more particularly crosslinked dextran, has been found to be substantially ineffective in forming the compositions of this invention as it does not form a physically intact sheet, i.e., one of uniform quality and free of gross holes.

The compositions of matter of this invention are "selectively binding" in that they contain active sites which are capable of selectively binding targeted biological materials from liquid mixtures containing the same, and have a network of pores formed throughout the composition which allow access to those binding sites which are internally fixed while allowing the liquid carrying the substances to be acted upon by the binding sites to flow through. When used for chromatographic separation and/or purification, the binding may be accomplished in various ways known to those skilled in the art, e.g., by affinity binding via ligand binding sites such as bioactive proteins attached to the cellulose or agarose; by ion-exchange binding via cationic or anionic groups attached to the cellulose or agarose; or by hydrophobic interaction chromatography or other known procedures. The porous sheet containing the bound material may then be washed free of any unbound substance and the desired bound substance recovered from the cellulose or agarose binding sites by various known elution techniques.

When used as a bioreactor, for example, an enzyme or an organism capable of generating an enzyme may be affixed to the activated sites on the media, either directly or through a ligand. A carrier liquid containing the substance to be lyzed is then passed through the sheet so that the bound enzyme or enzyme-releasing organism acts upon such substance. In similar manner, the inventive porous sheet can be used for water purification, sewage treatment, and the like.

From the above it will be evident that by the term "activated polysaccharide," as employed herein is one in which the polysaccharide has been treated in order to introduce into it chemically bound reactive sites, as described in detail below, which will selectively and reversibly bind or otherwise react with chosen biological substances. The choice of which of the above-described matrices and polysaccharide derivatives, i.e. which type of binding site is appropriate for recovery of any given biological substance, is one which can readily be determined routinely by those skilled in the art, depending upon the nature and properties of the targeted substance and the like. The polysaccharide must be insoluble in the liquid carrier containing the substance to be treated. Generally, the carrier will be an aqueous fluid, although non-aqueous fluids in which the polysaccharide should also be insoluble, may likewise be used.

Included amongst the biological substances which may be separated and recovered through the use of the novel composition of this invention are biomolecules such as proteins, e.g., enzymes, serum proteins and the like, peptides, including polypeptides, amino acids, antibodies, glycoproteins, human growth factor, and proteins made by recombinant DNA. Also separable are nucleic acids, polysaccharides, lipids, terpenoids, and other molecules separable by chromatography.

By "layers of sheets" is meant that, optionally, an assembly of a plurality of parallel sheets according to this invention may be bound together at their periphery to provide unitary, high capacity separation and purification or reactor modules.

The inventive composition of matter has increased protein-binding capacity as compared to prior art silica particle containing sheets and, as a further advantage, is also highly resistant to strong alkalis used in cleaning cycles, particularly those alkalis with pH's greater than 10, thus maintaining its functionality over extended periods of time despite repeated use. In addition to the above advantages it has also been found that the sheets of this invention, particularly the cellulose- or agarose-based sheets, possess little or no non-specific binding capacity, i.e., they are highly selective for specific biological substances, depending upon the nature of the activated cellulose employed in the composite sheet.

The porous sheets of this invention also may be employed as carriers for insecticides, herbicides, fungicides, or the like, by their absorption of such substances. Saturation of the inventive porous sheets with the desired active ingredient or ingredients, followed e.g. by laying out strips of the sheet in the field or the like, with or without fertilizers, seeds, adjuvants, etc. can serve as an effective, controlled means for applying these agents, particularly in a slow release fashion. Alternatively, these impregnated sheets can be incorporated as protective barriers in houses under construction.

BRIEF DESCRIPTION OF THE DRAWING

The Figure is a chromatogram evidencing the effectiveness of the composition of this invention in the separation of egg white into its component proteins as described below, using a diethylaminoethylcellulose-filled microporous sheet.

DETAILED DESCRIPTION OF THE INVENTION

Figure 1:
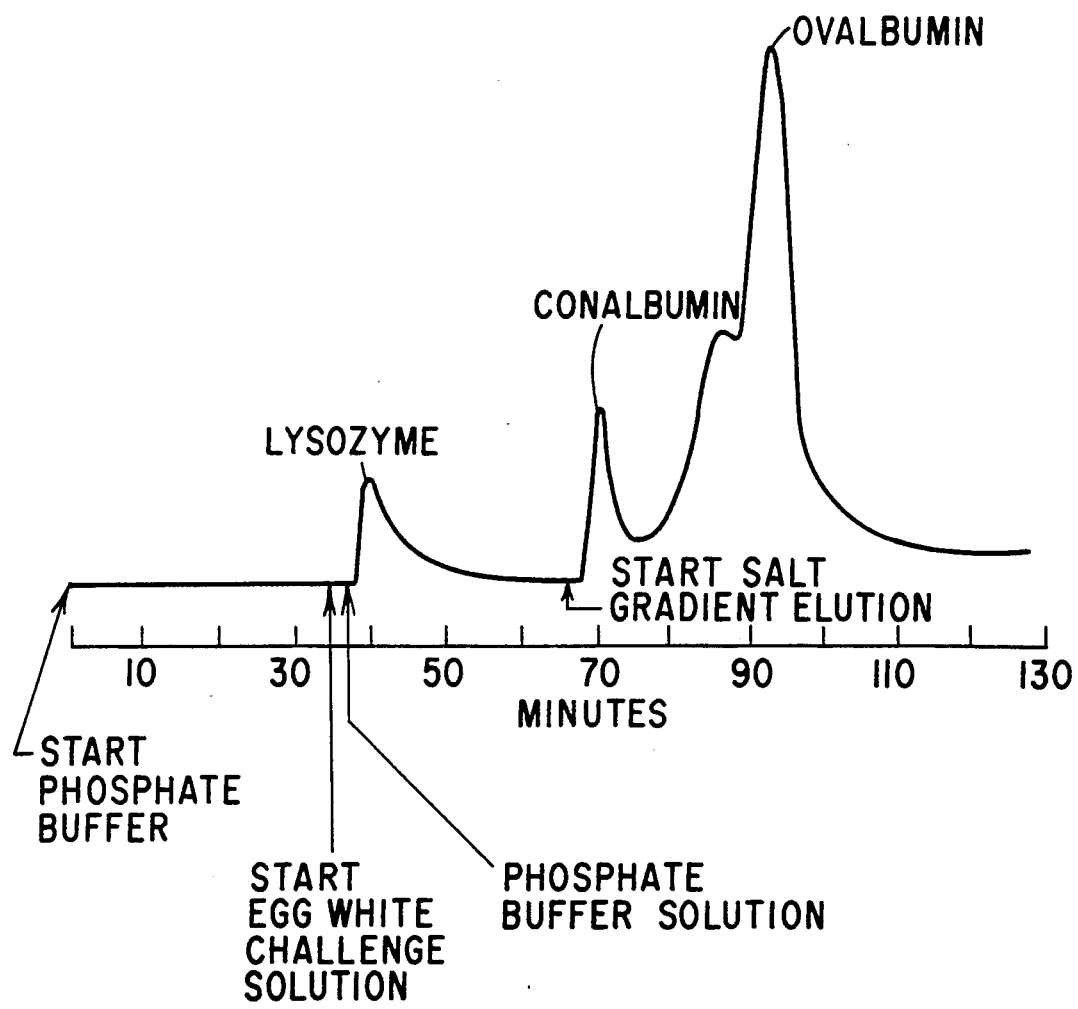

Other than in the operating examples, or where otherwise indicated, numbers expressing quantities of ingredients, parameters, or reaction conditions used in this specification are to be understood as modified in all instances by the term "about".

Those skilled in the art will recognize from the above-acknowledged patents and related literature that the porous sheets of this invention may be prepared in several different ways. For example, in accordance with one method, as set forth below, this sheet composition may be formed as follows, employing the following ingredients: (1) a polymeric resin such as a thermoplastic resin which serves as the matrix, for example, resinous polyvinyl chloride; (2) a volatile solvent, e.g., cyclohexanone, which serves to plasticize or solubilize the resin as well as swell the polysaccharide, and help form some of the pores; (3) a selective-binding medium comprising an activated polysaccharide in particulate or fibrillated form, such as activated agarose, activated cellulose, or the like, which is capable of capturing a controlled amount of solvent, or non-solvent, as described below, which may later be removed under controlled conditions to leave behind the desired system of micropores as will be more fully explained below; and (4) a volatile non-solvent pore former such as water which is capable of being absorbed by the selective-binding medium.

Optionally, in place of a resin matrix and the volatile solvent in which it has been plasticized, the matrix may be formed from a latex, i.e., an aqueous resin emulsion, as for example latexes available from Union Carbide under the trademark UCAR, as shown below in Example 2.

In preparing the sheets of this invention, it is preferable that the matrix be formed from a vinyl chloride resin of the "EP" or "easy processing" type. An EP resin is characterized by resin particles which are porous and highly absorbent, as compared to commercial resin particles having a hard glossy beaded appearance. A good example of a suitable resin, desirably a thermoplastic resin, is a non-plasticized, gamma vinyl chloride homopolymer resin such as that commercially available from B.F. Goodrich Company. The vinyl chloride resin binder may also be a copolymer of vinyl chloride and a small amount (for example up to about 15%) of a monoethylenic monomer, i.e., vinyl acetate, vinylidene chloride or fluoride, propylene, or ethylene, or latexes formed therefrom. Exemplary copolymers of the latter type suitable for use with the present invention also include commercially available propylene modified vinyl chloride resins or vinyl acetate modified vinyl chloride resins.

Other thermoplastic resins which may be used to form the matrix include water-insoluble cellulose esters such as cellulose acetate, polysulfones, and polyolefins. Similar thermoplastic resins known to those skilled in the art also can be used as long as the resins are materials which can be converted to a dough-like, semi-plasticized state with the aid of a solvent so as to be readily capable of shaping by extrusion or calendering while in this semi-plasticized state, and which, upon removal of solvent and consequently deplasticization, retain the resulting shape at the temperature at which the sheet is ultimately intended to function. The resinous matrix also should be a material which is chemically and physically stable under the conditions of intended use; that is, the resin should resist attack by the fluids or gases within which it will be used, it should be tough and have adequate tensile strength, and it should be able to withstand the ambient temperatures under which the composition is expected to be used and function.

The solvent for the matrix should have an appreciable solvating or plasticizing action on the resinous material and should be capable of being readily absorbed by the selective-binding medium. Although water can be used where the resin is in latex form, organic solvents are preferred and include but not limited to: acetone, liquid ethers, dimethyl formamide, orthochlorobenzene, nitrobenzene, tetrahydrofuran and such ketones as cyclohexanone, methyl cyclohexanone, methyl ethyl ketone, and methyl isopropyl ketone. Cyclohexanone is a particularly preferred solvent since it is capable of properly plasticizing polyvinyl chloride and is only slightly soluble in water. Moreover, it has the capacity of being readily absorbed by cellulose and has a sufficiently high boiling point to allow for plasticization and extraction at temperatures above room temperature.

The amount of solvent employed can range from 1.0 to 3.0 parts per part of resin by weight, with a range of 1.7 to 2.3 parts per part of resin being particularly preferred.

It is necessary, for purposes of this invention, that the polysaccharide be in an "activated" form which, for purposes of this invention, is defined as a polysaccharide containing predetermined functional moieties capable of selectively binding certain targeted materials, preferably biological substances.

Included among the activated cellulose materials which are suitable in the selective-binding compositions of this invention are such compounds as diethylaminoethyl (DEAE) cellulose, carboxymethyl cellulose, phosphocellulose, quaternary ammonium substituted cellulose, and sulfoxyethyl cellulose. Each of these materials may be prepared in a known manner (see, for example, Peterson et. al., "Biochem. Preps., Vol. 8, (1961), regarding the preparation of DEAE cellulose), and in any event are known commercial materials available from such sources as Whatman Co. (Whatman Paper Co., Ltd., Maidstone, England) or BioRad Corp. (Richmond, Calif.).

Activated agarose which may be employed herein and is commercially available or else may be prepared in a known manner (see the Agarose Monograph, below) comprises, for example, carboxymethyl agarose, diethylaminoethyl agarose, and like derivatives corresponding to the above cellulose derivatives, which are available from Pharmacia Fine Chemicals, Inc. (Piscataway, N.J.). Typical affinity-binding ligand groups which may likewise be employed include those available in the 1990 catalog of Sigma Chemical Co., St. Louis, Mo., as well as those shown, for example, in The Agarose Monograph, 4th Ed. (1988), pp. 102-104, at page 103, published by FMC Corp., Phila., Pa., which is incorporated herein by reference.

Mixtures of different polysaccharides which are activated may be used, as well as mixtures of activated polysaccharides with non-activated polysaccharides such as cellulose, for example DEAE-agarose/microcrystalline cellulose, provided such mixture affords adequate activated sites for the purpose of the invention.

If desired, the polysaccharide may be further activated, i.e., functionalized with various ion exchange groups or affinity ligands after first being incorporated in the resinous matrix, i.e., in situ. More preferably, however, activated polysaccharides are prefunctionalized before being incorporated in the porous sheet.

The cellulose component of this composition may comprise any commercial cellulose, as for example microcrystalline cellulose, e.g., AVICEL® PH 105 (FMC Corp., Phila., Pa.), or Whatman cellulose CC31 (Whatman Paper, Ltd., Maidstone, England). Similarly, known commercial, cross-linked agarose may likewise be employed herein, as for example those prepared from SEAKEM® agarose, SEAPLAQUE® agarose or SEAPREP® agarose from FMC Corp. Phila., Pa.

Selected other activated polysaccharides which may also be employed in the above-described composition include such water-insoluble compounds as carrageenan, alginate, chitosan, and konjac, or mixtures thereof, which have been activated to provide binding sites and which, when necessary, have been cross-linked to make them water-insoluble, wherein the active sites may be the same affinity-binding or ion-exchange groups as illustrated above for cellulose and agarose.

The polysaccharides used herein should be in particulate or fibrillated form.

The amount of activated polysaccharide incorporated by weight into the composition relative to the resinous matrix is not critical, but desirably may range from 0.3:1 to 3:1 by weight of the polysaccharide to resin. preferably from 0.5:1 to 1.8:1, and more preferably 1.2:1 to 1.6:1.

METHODS FOR PREPARATION OF THE INVENTION MATERIALS

In one preferred method of preparing the fluid permeable porous material of the present invention the thermoplastic resinous binder and the cellulose or agarose are pre-blended together in a mixing device such as Hobart TM blender, a Patterson-Kelly TM V-blender with intensifier bar, or a Waring TM blender. A solvent for the resin (e.g., cyclohexanone) is then added over about a 20-minute period while continuously mixing the solids and liquids. Devices suited for this application involving liquid addition to mixing solids include the above blenders or like devices known in the art.

When the medium is anhydrous or contains little water, a non-solvent such as water is then added over, e.g., a 20-minute period. When the non-solvent is employed in significant excess of the above ratios, sheets of uniform physical quality and appearance are formed only with difficulty, if at all. In some cases the water may already be present in the media material in satisfactory amounts, e.g., in undried cross-linked DEAE agarose, or hydrated DEAE cellulose.

The resultant damp, granular material (resembling a damp grated cheese) is then introduced, batchwise, into a Brabender TM mixer. This device kneads and heats the material into a dough-like consistency. This dough may then be removed from the Brabender TM blender and roughly formed into flattened pieces of sheeting which may then be placed between two layers of release paper and hot pressed in a mold to obtain the desired dimensions of the sheet material of this invention. By "release paper" is meant a material which has a smooth, non-adhering and impervious surface. Such materials as polyethylene-coated freezer paper and the like have been found suitable for this purpose. The sheet is then removed from the release paper and, if necessary, placed on a rigid support such as a screen and the solvent extracted in a hot-water bath followed by drying in an oven, or by air drying, as desired.

Alternatively, the resultant dampish granular material described above may instead be fed to an extruder such as a Bonnet 2" single screw forming extruder (Bonnet Co., Kent, Ohio), which further mixes and heats the material, forming a dough which can be continuously extruded through a die (which preferably has been heated first for a few minutes) into sheet form. The sheet may, if desired, be calendered between rolls to further smooth, size or emboss a pattern thereon.

Regardless of which of the above methods for forming a sheet is employed, i.e., whether molded or extruded, the necessary pores are then formed by introducing the resulting sheet into an extraction liquid or bath which is capable of extracting the solvent from the formed sheet and of replacing the solvent in the sheet with the extracting liquid without appreciable dissolving or swelling of the resinous binder matrix in the sheet. Thus, for example, the calendered or molded sheet may be placed on a transport screen or other suitable carrier means and passed through an extraction bath containing water having a temperature ranging from 120° F. (49° C.) to 180° F. (82° C.). The extraction time is not critical and may range, for example, from 1 to 4 hours, depending upon the thickness, concentration gradient, bath temperature, type of solvent, and other factors. Thus, it is only necessary that the sheet is maintained in the extraction bath until substantially all the solvent has been leached or removed from the sheet and replaced therein by the extraction liquid (e.g., water).

The extracted porous sheet is then dried to remove the extraction liquid, for example by passing the extracted sheet through a dry air oven at a temperature of 150° F. (71° C.) to 300° F. (149° C.) thereby evaporating the extraction liquid from the sheet. Removal of the extraction liquid from the sheet results in the formation of a dimensionably stable porous system within and throughout the sheet. Once the pore structure has been formed, the dried, dimensionably stable sheet may then be cut to the size and configuration desired for use in this invention, preferably after the sheet has cooled to room temperature.

The pores formed as a result of the described processes comprise a dimensionably stable continuing network throughout the polysaccharide-filled resinous matrix. Thus, the pores are formed not only through the resin, and between the dispersed media particles, but also in the interstitial areas between the resin and the media of this composite material.

It will be understood that the size of the individual pores or voids can vary somewhat throughout the composition. For example, by employing the well known Mercury Intrusion Method for porosimetrically determining pore size and pore size distribution, it is not unusual to find in a typical example of the porous material of the present invention, pores or voids ranging in size from 1 to 40 microns, more preferably 10 microns to approximately 30 microns, with a mean pore diameter of 25 microns. (A membrane or sheet having micron sized pores is defined as "microporous" [Dictionary of Scientific and Technical Terms, 2nd ed., McGraw-Hill pub. (1978)].) In order to attain this desired pore size there may conveniently be mixed into the dough aqueous solutions of water-soluble materials such as sodium carbonate or the like, which are inert to the components of the sheet but which can later be leached out with water to leave the desired pores. In this case such leaching is desirably achieved by placing the sheet in water for a sufficient period of time.

It will be noted that the random distribution of varying sized pores extends not only in the two dimensions but extends along the third dimension or thickness dimension of the porous material, i.e., the random distribution of pore or connected microvoid size will vary in a like manner along the third dimension. This results in the provision of a porous material which instead of having distinct pores of relatively uniform size extending from one surface to the other, comprises a multitude of random-direction paths whose respective lengths desirably are many times greater than the thickness of the sheet and whose respective diameters vary randomly along their length.

UTILIZATION OF THE INVENTIVE MICROPOROUS SHEETING

An apparatus or device employing the composition of this invention for affinity or ion-exchange chromatography or as a chemical or biochemical reactor, may be characterized by the necessity to direct the carrier liquid most efficiently through the pores of the inventive microporous sheeting so that the biological material within the carrier liquid to be acted upon by the inventive sheeting, [i.e. to be bound (in the case of chromatography) or otherwise treated (in the case of a chemical, enzymatic, etc., reaction)] is maximally exposed to the active sites on the polysaccharide particle medium dispersed throughout the inventive microporous membrane, or to chemical or biological reactive substances bound to such medium.

In carrying out a separation or other process with the selective binding composition of this invention it may be useful first to remove from the liquid carrier those undesired particles in excess of the sheet pore size in order that they not get entrapped in or on the surface of the selective binding sheet. This is accomplished by the microporous sheet itself since such particles are inherently prevented from entering the micropores. Although means for filtering out undesired large particles may be placed in-stream before the inventive microporous sheeting, cross-flow rather than dead-end presentation of the carrier liquid to the microporous sheet surface frequently will avoid clogging of the micropores by the undesired particles.

The composition of this invention may be employed as a single sheet through which the liquid containing the targeted substance or substances is passed. Alternatively, the sheets may be assembled in parallel layers, preferably of equal dimensions, and bonded or fixedly clamped together at their peripheries to afford a unitary module of a plurality of layered sheets in any desired thickness through which a fluid may be passed in a controlled fashion. There is no limitation as to the material used for bonding the sheet peripheries other than that it be inert to the materials to be treated and not exude any substance which will contaminate such materials; any number of thermoplastic or thermosetting resins are suitable.

To achieve maximum efficiency, it is important to minimize or preferably eliminate the natural tendency of the carrier liquid to "channel" around the microporous sheeting by following a path of least resistance. This may be achieved by affording a physical barrier to such channeling, typically by affixing the inventive sheets or plurality of such sheets within a housing that permits entry and diffusion of the carrier liquid and exit of such liquid after it has passed through the inventive microporous sheeting. Various devices and/or methods are known for this purpose related to the prior art PVC/silica microporous sheeting. While such devices and/or methods for their use per se do not comprise a part of this invention, such devices and/or methods in conjunction with the inventive porous sheeting is considered another embodiment hereof.

Known embodiments of devices and/or methods employing the resinous matrix/inorganic particle microporous sheeting disclosed in U.S. Pat. Nos. 3,862,030 and 3,931,067 include, but are not limited to those disclosed in 3,993,556; 4,102,746; 4,169,014; 4,689,302; and 4,801,014; all of which are incorporated herein by reference.

A known device useful for holding the microporous sheets of this invention, which comprises an assembly of parallel prior art sheeting, is the ACTI-MOD ™ separation and purification cartridge (a product of FMC Corporation, Philadelphia, Pa., as advertised in "American Biotechnology Laboratory", pp. 27–31, Nov./Dec., 1989); another device is the ACTI-DISK½ separation and purification cartridge (a product of FMC Corporation, Philadelphia, Pa., as mentioned in "High Tech Separation News", Jul. 1989, p. 4) which employs a single prior art sheet within a spindle-like housing. A third known device employs spiral wound sheeting, as disclosed by U.S. Pat. No. 4,689,302, which is incorporated herein by reference. The microporous sheets of this invention may be substituted for the prior art sheeting within all of the above devices. It should be noted that because of the improved binding efficiency of the inventive sheeting composition, fewer such sheets need be employed in an ACTI-MOD ™ type cartridge, to achieve the same result.

Those skilled in the applicable art will readily be able to identify, by the nature of targeted material, which particular polysaccharide derivative may desirably be used to selectively bind that material.

EXAMPLES

In the following examples sheets of this invention were prepared by pressing the dough between two layers of release paper, leaching and drying the formed sheets, and cutting them into sample sizes for testing their selective-binding and recovery capabilities. Several different types of activated cellulose or agarose were employed, as shown in Table 1 below, together with the permeability properties and protein-binding and releasing capacity of the sheets.

The binding capacity values reported in Table 1 were determined in accordance with the following:

Procedure for Measuring Protein Binding Capacity and Release Characteristics of Porous Sheets The solutions used in this procedure are prepared as follows:

a) Phosphate buffer stock solution (0.1M) is prepared by dissolving 14.20 grams of anhydrous dibasic sodium phosphate in 975 mL of distilled water. The pH of this solution is adjusted to 7.2 with concentrated phosphoric acid, and sufficient distilled water is added to make one liter of solution. Prior to use, this stock solution is diluted with sufficient distilled water to provide a 0.01M phosphate buffer. The pH is again adjusted to 7.2 with concentrated phosphoric acid.

b) Acetate buffer stock solution (0.2M) is prepared by dissolving 16.4 grams of anhydrous sodium acetate in 975 mL of distilled water. The pH of this solution is adjusted to 4.7 by adding 95% acetic acid. After adjustment of the pH, sufficient distilled water is added to make one liter of stock solution. Prior to use, this stock solution is diluted with sufficient distilled water to give a 0.02M acetate buffer. The pH is again adjusted to 4.7 using 95% acetic acid.

c) Bovine serum albumin challenge solutions are prepared by dissolving 1.00 gram of bovine serum albumin (A-7906, Sigma Chemical Co., St. Louis, Mo.) in 1000 mL of the dilute phosphate buffer solution (a) or 1000 mL of the dilute acetate buffer solution (b), a concentration of 1 mg of albumin per mL of buffer solution. The bovine serum albumin in phosphate buffer challenge solution was used in Examples 1–13, 18, 20, 21, 23 and 24. The bovine serum albumin in acetate buffer challenge solution was used in Examples 14–16 and 19.

d) Lysozyme challenge solution is prepared by dissolving 1.00 gram of lysozyme (L6876, Sigma Chemical Co., St. Louis, Mo.) in 1000 mL of the dilute acetate buffer solution (b), a concentration of 1 mg of lysozyme per mL of acetate buffer solution. This challenge solution was used in Example 17.

e) Protein release solution is prepared by dissolving 58.45 grams of sodium chloride in sufficient dilute buffer solution, either phosphate or acetate, consistent with the challenge solution used, to make 1000 mL of solution, a 1M concentration of sodium chloride. The pH is adjusted to the pH of the challenge solution using dilute sodium hydroxide or hydrochloric acid if required.

Thereafter, a 47 mm diameter disk is cut from a porous sheet. After measuring the thickness of this disk and determining its weight, it is placed in a Swinnex TM filter holder. This holder is connected by tubes to a pump which, in turn, is connected to calibrated reservoirs containing solutions (a) or (b), (c) or (d), and (e). The outlet of the filter holder is attached to a UV detector which measures the absorbance of the effluent at 280 nm. Initially, buffer solution is pumped through the system to equilibrate the porous sheet and remove air bubbles from the system. The flow is then switched to bovine serum albumin challenge solution which is pumped at 5 mL/minute. The effluent is collected during the pumping of this challenge solution. Pumping is continued until the optical density of the effluent reaches 85% of the absorbance of bovine serum albumin challenge solution (1 mg/mL). At this point the flow of bovine serum albumin challenge solution is stopped, the volume that was pumped is recorded, and phosphate buffer solution is then pumped through the system until the optical density of the effluent returns to its baseline value. The effluent during the challenge phase and the subsequent flush with buffer is collected in a single container and its volume is measured and recorded. After stirring the collected effluent thoroughly, its optical density is measured, and the content of bovine serum albumin is calculated. The albumin bound by the disk is calculated by subtracting the amount of albumin in the effluent from the amount of albumin passed through the disk.

The second phase of the experiment determines how much of the bound albumin is released from the porous sheet. The protein release solution is pumped through the disk at 3 mL/minute. Effluent from this operation is collected in a clean vessel. Pumping is continued until after the optical density of the effluent has reached a maximum value and then returned to a baseline level. The total volume of effluent is measured, and, after being mixed thoroughly, its optical density is measured. From these measurements the amount of albumin in the effluent is calculated.

The following examples illustrate methods for preparing various compositions within the scope of this invention. The resulting sheets were then used in certain of the examples of Table 1 (below), as indicated. The other sheets employed in this table were prepared in a like manner.

EXAMPLE 1

Preparation of diethylaminoethyl cellulose/polyvinyl chloride porous sheets

Diethylaminoethyl cellulose (25.7 g, Whatman DE 32, Whatman Paper Ltd., Springfield Mill, Maidstone, Kent, England) and 18.3 g of polyvinyl chloride beads (140 microns diameter, GEON 103 EP (F76), B.F. Goodrich Rubber Co., Akron, Ohio) were mixed in a Waring TM blender at high speed for three minutes. These premixed solids were transferred to a Hobart Model N-50 five quart blender fitted with an anchor-type agitator. During a 20 minute period 36.7 g of cyclohexanone was added to the mixture. Upon completion of addition, 36.7 g of water was added during a 20 minute period, producing damp granular solids. A portion of these solids was transferred to a Brabender TM mixer, roller style with a fixed blade, having a capacity of approximately 60 mL. The granular material was mixed at 65° C. for five minutes at a blade speed of 39 rpm, producing a warm dough. A portion of the warm dough was rolled into a rough sheet. This rough sheet was placed between two sheets of release paper, and this combination was placed in a mold 13 inches (33.0 cm) long by 3 inches (7.6 cm) wide and 0.029 inches (0.0725 cm) deep. The mold was placed in a hydraulic press at 63° C. for 30 seconds. Upon removal from the press, the damp "green" sheet was peeled from the release paper and was placed on a 10 mesh, stainless steel screen. The sheet and screen were immersed in a 60° C. water bath, remaining there for 60 minutes. The wet sheet was then placed in a 60° C. convection oven for a period of approximately 90 minutes to dry.

This sheet was then tested as shown in Example 1 of Table 1.

EXAMPLE 2

Preparation of diethylaminoethyl cellulose/polyvinyl chloride latex porous sheets In a weighing dish were mixed 3.0 g of diethylaminoethyl cellulose (BioRad Cellex ® D, BioRad Laboratories, Richmond, Calif.), 9.1 g of the latex UCAR ® Acrylic 505 aqueous emulsion (55 wt. % solids) (a polymer composed of vinyl acetate, vinyl chloride, butyl acrylate, and acrylic acid; UCAR Emulsions Systems, Union Carbide Corporation, Torrance, Calif.), and 21.5 g of an aqueous solution of sodium carbonate saturated at 35° C. The resulting paste was spread on release paper in a layer approximately 1.5 mm thick. This was allowed to air dry for several hours after which the sheet was peeled from the release paper. The sheet was then placed in a 60° C. convection oven for several hours. The dried sheet was then held in running water at 30° C. to leach the sodium carbonate from it. Sheets prepared in this manner were porous and possessed significant structural integrity.

This sheet was then tested as shown in Example 2 of Table 1.

EXAMPLE 3

Preparation of diethylaminoethyl cellulose/cellulose acetate porous sheets

Diethylaminoethyl cellulose (29.28 g, Whatman DE 32) and cellulose acetate (18.3 g) were mixed in a Waring TM blender at high speed for three minutes. These premixed solids were transferred to a Hobart TM Model N-50 five quart blender fitted with an anchor-type agitator. During a 20 minute period 29.28 g of cyclohexanone was added to the mixture. Upon completion of addition, 45.75 g of water was added during a 20 minute period, producing damp granular solids. A portion of these damp solids was transferred to a Brabender TM mixer in which it was mixed at 65° C. for five minutes at a blade speed of 39 rpm producing a warm dough. Porous sheets were molded from this material by the method of the first example (above). These sheets were also leached in water and dried as in the first example (above).

This sheet was then tested as shown in Example 3 of Table 1.

EXAMPLE 22

Preparation of diethylaminoethyl cellulose/polysulfone porous sheets

Diethylaminoethyl cellulose (25.6 grams, Whatman DE 32) and 18.3 grams of polysulfone P-1800 (Amoco Performance Products, Atlanta, Ga.) were mixed in a Waring blender at high speed for three minutes. These premixed solids were transferred to a Hobart Model N-50 five quart blender fitted with an anchor-type agitator. During a 20 minute period 32.9 grams of cyclohexanone was added to the mixture. Upon completion of addition, 36.6 grams of water was added during a 20 minute period, producing a granular material. A portion of this material was transferred to a Brabender mixer, roller style with a fixed blade, having a capacity of 60 mL. The granular material was mixed at 65° C. for five minutes at a blade speed of 39 rpm, producing a warm dough. A portion of this dough was rolled into a rough sheet which was placed between sheets of release paper and molded in a hydraulic press as in Example 1. The damp "green" sheet was then removed from the release paper, placed on a stainless steel screen, and placed in a 60° C. water bath for one hour. After removal from the water bath, the sheet was then placed in a 60° C. convection oven for one hour to dry. The resulting sheet was considerably more flexible than sheets prepared from polyvinyl chloride and appeared to have a surface skin, but the sheet was porous having a permeability of $4.7 \times 10^{-10}$ cm$^2$.

This sheet was then tested as shown in Example 22 of Table 1.

COMPARATIVE DEXTRAN-CONTAINING SHEET

Preparation of diethylaminoethyl dextran/polyvinyl chloride porous sheets

Cross-linked diethylaminoethyl dextran (25.7 grams, SEPHADEX ® A-50, Pharmacia Fine Chemicals, Piscataway, N.J.) and 18.3 grams of polyvinyl chloride beads (GEON TM 103 EP (F76)) were mixed in a Waring blender at high speed for three minutes. These premixed solids were transferred to a Hobart TM Model N-50 five quart blender fitted with an anchor-type agitator. During a 20 minute period 36.7 grams of cyclohexanone was added to the mixture. Upon completion of addition, 36.7 grams of water was added during a 20 minute period, producing a granular mixture. A portion of this material was transferred to a Brabender TM mixer, roller style with a fixed blade, having a capacity of 60 mL. The granular material was mixed at 65° C. for five minutes at a blade speed of 39 rpm, producing a warm, sticky mass. A portion of this warm, sticky mass was rolled into a rough sheet which was placed between sheets of release paper and molded in a hydraulic press as in the preparation of the sheet for Example 1. The damp "green" sheet was peeled from the release paper and was placed on a stainless steel screen, and the combination was placed in a 60° C. water bath. Upon removal from the water bath the sheet was dried in a 60° C. convection oven for one hour. The sheet that was produced contained many holes and appeared similar in appearance to Swiss cheese, and could not be tested. Apparently, the crosslinked dextran was soluble in the combination of water and cyclohexanone.

TABLES

In the following, Examples 1-22 (Table 1) are according to this invention and state various tested inventive sheet properties, including the desirably high binding capacity of the inventive compositions for proteins (using bovine serum albumen and lysozyme as test substances). Examples 23-27 (Table 2) are comparative examples stating the results obtained from prior art materials using the same test substances and demonstrating markedly lower binding capacities.

In the Tables, the sheets of Examples 1, 4, 5, 6, 9, 10, 13, 15, 16, 19, 21, 23, and 24 were replicated two or more times using essentially the same formulation weight ratios. The reported Sheet Property test results are averages of the measurements for each set of replicates.

As an illustration of the increase in protein binding capacity of the material of this invention compared to the prior art silica-media porous sheet material, e.g. PEI PVC/silica, note Examples 1 and 23 of Tables 1 and 2.

TABLE 1

INVENTION EXAMPLES

| Example | Polysaccharide | Formulation Weight Ratios | | | | Sheet Properties | | | | |
|---|---|---|---|---|---|---|---|---|---|---|
| | | Matrix | Polysaccharide Matrix | Cyclohexanone Matrix | Water Matrix | Thickness (inch) | Protein* bound (mg) | Calc'd % of protein released | Binding Capacity | |
| | | | | | | | | | (mg/cc) | (mg/g) |
| 1 | diethylamino-ethylcellulose$^a$ | PVC | 1.4 | 2.0 | 2.0 | 0.062 | 153 | 94 | 71 | 186 |
| 2 | diethylamino-ethylcellulose$^a$ | PVC$^c$ | 0.6 | — | 3.8 | 0.062 | 42 | 100 | 19 | 29 |
| 3 | diethylamino-ethylcellulose$^a$ | cellulose acetate | 1.6 | 1.6 | 2.5 | 0.049 | 117 | 95 | 68 | 167 |
| 4 | diethylamino-ethylcellulose$^a$ | PVC | 0.5 | 1.3 | 1.3 | 0.043 | 87 | 92 | 58 | 110 |
| 5 | diethylamino-ethylcellulose$^a$ | PVC | 1.0 | 2.0 | 2.0 | 0.036 | 101 | 94 | 80 | 173 |
| 6 | diethylamino-ethylcellulose$^a$ | PVC | 1.2 | 2.0 | 2.0 | 0.045 | 120 | 96 | 76 | 193 |
| 7 | diethylamino-ethylcellulose$^a$ | PVC | 1.2 | 2.0 | 2.2 | 0.030 | 113 | 68 | 108 | 248 |
| 8 | diethylamino-ethylcellulose$^a$ | PVC | 1.2 | 2.2 | 2.2 | 0.048 | 132 | 93 | 78 | 199 |
| 9 | diethylamino- | PVC | 1.4 | 2.0 | 2.2 | 0.046 | 132 | 88 | 83 | 193 |

TABLE 1-continued
INVENTION EXAMPLES

| Example | Polysaccharide | Matrix | Formulation Weight Ratios Polysaccharide Matrix | Cyclohexanone Matrix | Water Matrix | Thickness (inch) | Protein* bound (mg) | Calc'd % of protein released | Binding Capacity (mg/cc) | Binding Capacity (mg/g) |
|---|---|---|---|---|---|---|---|---|---|---|
| 10 | diethylamino-ethylcellulose[a] | PVC | 1.4 | 2.2 | 2.2 | 0.048 | 92 | 86 | 57 | 119 |
| 11 | diethylamino-ethylcellulose[a] | PVC | 1.6 | 2.0 | 2.0 | 0.054 | 168 | 94 | 89 | 180 |
| 12 | diethylamino-ethylcellulose[a] | PVC | 1.6 | 2.0 | 2.4 | 0.043 | 133 | 91 | 88 | 181 |
| 13 | diethylamino-ethylcellulose[a] | PVC | 1.8 | 2.0 | 2.0 | 0.048 | 133 | 97 | 79 | 191 |
| 14 | carboxymethyl cellulose[e] | PVC | 1.4 | 2.0 | 2.0 | 0.067 | 126 | 90 | 54 | 165 |
| 15 | carboxymethyl cellulose[e] | PVC | 1.6 | 2.0 | 2.0 | 0.068 | 188 | 96 | 78 | 247 |
| 16 | carboxymethyl cellulose[e] | PVC | 1.6 | 2.0 | 2.2 | 0.080 | 180 | 94 | 65 | 214 |
| 17 | phospho-cellulose[f] | PVC | 1.4 | 2.0 | 2.0 | 0.038 | 49 | 110 | 37 | 87 |
| 18 | quaternary ammonium cellulose[g] | PVC | 1.4 | 2.0 | 2.0 | 0.052 | 195 | 93 | 107 | 276 |
| 19 | sulfoxyethyl-cellulose[h] | PVC | 1.4 | 2.0 | 2.0 | 0.074 | 154 | 85 | 59 | 183 |
| 20 | crosslinked DEAE agarose[i] | PVC | 1.4 | 2.0 | 2.0 | 0.048 | 108 | 88 | 64 | 169 |
| 21 | DEAE agarose[i]/microcrystalline cellulose[j] | PVC | 1.4 | 2.0 | 2.0 | 0.035 | 52 | 104 | 43 | 87 |
| 22 | diethylamino-ethylcellulose[a] | poly-sulfone[n] | 1.4 | 1.8 | 2.0 | 0.054 | 172 | 89 | 91 | 213 |

TABLE 2
PRIOR ART EXAMPLES

| Example | Composition | Formulation Weight Ratios Composition Matrix | Cyclohexanone Matrix | Water Matrix | Thickness (inch) | Protein* bound (mg) | Calc'd % of protein released | Binding Capacity (mg/cc) | Binding Capacity (mg/g) |
|---|---|---|---|---|---|---|---|---|---|
| 23 | PEI PVC/silica[k] | — | — | — | 0.023 | 24 | 90 | 28 | 65 |
| 24 | PVC/silica[l] | — | — | — | 0.22 | 4 | 3 | 5 | 11 |
| 25 | Mem-Sep ® [m] | — | — | — | 0.394 | 45 | — | 32 | — |
| 26 | Microcrystalline Cellulose PH 105[o] | 1.4 | 2.0 | 2.0 | 0.043 | 1 | 78 | 1 | 1 |
| 27 | BioRex Anion[p] AG 50-W-X8 | — | — | — | 0.013 | 2 | — | 5 | 6 |

*Protein used as test model was bovine serum albumin except in Example 17 where lysozyme was used.
a. Whatman DE 32 diethylaminoethyl cellulose.
c. Polyvinyl chloride source was UCAR™ Acrylic 505 emulsion and matrix was BioRad Cellex™ D Std. Capacity.
e. Whatman CM 32 carboxymethyl cellulose.
f. Whatman WP 11 phosphocellulose.
g. Whatman WQA 52 quaternary ammonium cellulose.
h. Whatman WSE 52 sulfoxyethyl cellulose.
i. Sepharose® DCL 6B 100 diethylaminoethyl agarose (Pharmacia Fine Chemicals, Piscataway, N.J.).
j. Avicel® PH 105 (FMC Corporation, Phila., PA)
k. MPS™ Polyethyleneimine-activated microporous silica-filled sheets (FMC Corporation, Phila., PA).
l. MPS™ Microporous silica-filled sheets (FMC Corporation, Phila., PA).
m. Commercial unit containing cross-linked diethylaminoethyl cellulose (Millipore Corp., Bedford, MA).
n. Polysulfone was used in place of polyvinyl chloride; Polysulfone P-1800 (Amoco Performance Products, Atlanta, GA).
o. FMC Corp., Phila., PA.
p. Anion-exchange resin beads enmeshed in a polytetrafluoroethylene membrane (BioRad Corp., Richmond, Cal.).

Both porous materials contain weak anion exchange media, diethylaminoethyl (DEAE) and polyethylene imine (PEI), respectively. It is seen that the volumetric binding capacity of the sheet of this invention is 2.5 times greater than the PVC/silica material (71 vs 28 mg/cc). The weight binding capacity of the sheet of this invention is 2.8 times greater than the PVC/silica material (186 vs 65). Such an improvement in capacity has obvious process and economic advantages over the prior art material.

The test results in Table 2 when compared to Table 1 also show the lower non-specific binding of the material of this invention compared to the silica-based microporous sheet material of PEI PVC/silica. Note Comparative Examples 24 and 26 (for silica-based porous sheet and non-activated microcrystalline cellulose, respectively). Ideally neither material should bind protein. It is seen, however, from Table 2 that significantly more protein is absorbed by the silica-based material (4 mg vs 1 mg, respectively).

Furthermore, the % release of bound protein is much lower for the silica based sheet than for the cellulose-based sheet (3% vs 78%, respectively).

A further illustration of the lower non-specific binding of the cellulose-based material compared to the silica-based material, is found in the purification of IgG from goat serum. Pre-treated goat serum was passed through modules of DEAE cellulose (prepared in the manner of Example 1) and PEI silica-based sheets (Ex. 24). Under the conditions of the experiment, contaminating proteins bind and IgG passes through. It was found that the DEAE cellulose module delivered 95–100% of the IgG fraction while the silica-based sheet yielded 80–90% of the IgG. The latter reduction in IgG yield is ascribed to the higher non-specific binding of silica.

The following example illustrates the use of the DEAE cellulose porous sheet of Example 13 of the table in a standard test for the separation of egg white into its component proteins. The results are illustrated in FIG. 1.

EXAMPLE 28

Chromatographic separation of egg white into its component proteins using a diethylaminoethyl cellulose porous sheet A single 47 mm diameter disk from a porous sheet containing diethylaminoethyl cellulose (as in Example 13 of Table 1) was placed in a Swinnex ™ filter holder. Fresh egg white was dissolved in dilute (0.01M) phosphate buffer (above) at a concentration of 14.3 mg/mL, and 1.1 mL of this solution was pumped through the filter holder, followed by dilute phosphate buffer at 5 mL/min. Almost immediately a peak was observed as lysozyme (see the chromatogram of the Drawing), which did not bind to diethylaminoethyl cellulose. After the dilute phosphate buffer solution containing 0.5M sodium chloride was started at 2 mL/min through a linear gradient maker, the conalbumin was eluted. As shown in the Drawing a larger peak having a shoulder preceding it occurred when the ovalbumin was next eluted. Thus, the three major components of egg white: lysozyme, conalbumin, and ovalbumin, were separated completely from one another using an inventive porous sheet that was approximately 0.048 inch (0.123 cm) thick.

EXAMPLE 29

Resistance of the sheet of inventive Example 1 to degradation by high ph alkaline solutions Alkali aqueous solution, such as 0.5N NaOH, is often employed as a preferred bath for cleaning chromatographic media after use. Hence, it is a distinct advantage for a chromatographic material to be able to withstand alkaline cleaning cycles. To demonstrate the refractory nature of the sheets of this invention toward alkali attack, a series of 10 cycles of binding/flush/elution/flush followed by cleaning with 0.5N NaOH was performed.

A 47 mm disk having the composition of Example 1 was alternately challenged with 1 mg/ml BSA in 0.1M phosphate buffer, flushed with buffer, eluted with 1M NaCl, flushed with buffer and then subjected to 20 ml of 0.5N NaOH (pH 13). All flows were 5 ml/min except for the elution which was 2 ml/min. This cycle was repeated ten times. Binding and elution data are summarized below in Table 3.

From the data of Table 3 it is clear that binding capacity and releasability of the porous sheet material of this invention are not adversely affected by the alkali used. This is in contrast to the fact known in the art that silica based microporous sheets do not withstand such treatment.

TABLE 3

| Cycle | Protein Bound (mg) | Protein Eluted (mg) | Calculated Percent Release |
|---|---|---|---|
| 1 | 96 | 119 | 124 |
| 2 | 102 | 115 | 113 |
| 3 | 137 | 129 | 94 |
| 4 | 132 | 125 | 95 |
| 5 | 122 | 117 | 95 |
| 6 | 127 | 121 | 96 |
| 7 | 117 | 111 | 95 |
| 8 | 118 | 117 | 99 |
| 9 | 101 | 94 | 92 |
| 10 | 110 | 100 | 91 |

In a further embodiment of this invention, it has been determined that the composition of this invention, because of its good resistance to high pH conditions, may also advantageously be used as a separator in storage batteries, particularly alkaline batteries. This is in contrast, for example, to silica-containing resinous matrix battery separators such as described in U.S. Pat. No. 2,772,322, which are subject to erosion at high pH values. It will be understood that by "battery separators" is meant those well-known articles of commerce as described in U.S. Pat. No. 2,722,322 comprising thin sheets for separating electrodes in electric storage batteries, which sheets must both insulate each electrode and be porous to gases and liquids. Thus, the compositions of this invention may advantageously be substituted for these otherwise known battery components.

Desirably, for use as a battery separator, the amount of polysaccharide relative to the total weight of the inventive composition should be at least 50 wt. %, up to whatever amount of polysaccharide will still permit the structural integrity of the sheet to be maintained.

In a particular embodiment of this invention, the polysaccharide media in the battery separator sheet of this invention need not be an insoluble activated polysaccharide, but can be a soluble cellulose such as microcrystalline cellulose or hydroxyethyl cellulose. However, in such cases the amount of e.g., cellulose must, as above, be at least 50 wt % of the overall composition. This composition is advantageous for use as a battery separator over the compositions of U.S. Pat. No. 4,705,809 in that it is hydrophilic and spontaneously water-wettable even after the soluble material has been leached out of the membrane.

When the inventive porous sheeting material is employed as a battery separator, it is made suitably thin and is fitted in between the electrodes of storage batteries to prevent the charged plates from contacting each other. The pores of the inventive sheets are of sufficient size to permit the passage of gases and electrolytes without allowing particulate solids to pass through.

EXAMPLE 30

Preparation of a microcrystalline cellulose/polyvinyl chloride porous sheet used as a battery separator Microcrystalline cellulose (101.7 grams, Avicel ® PH105, FMC Corporation, Philadelphia, Pa.) and 63.6 grams of polyvinyl chloride beads (GEON 103 EP (F76)) were mixed in a Waring blender at high speed for three minutes. These premixed solids were transferred to a Hobart Model N-50 five quart blender fitted with an anchor-type agitator. During a 20 minute period 95.4 grams of cyclohexanone was added to the mixture. Upon completion of addition, 95.4 grams of water was added to the mixture during a 20 minute period, producing a granular material which appeared similar to grated cheese. A portion of this material was transferred to a Brabender mixer, roller style with fixed blade, having a capacity of 60 mL. This granular material was mixed at 65° C. for five minutes, producing a warm dough. This warm dough was rolled into a rough sheet which was placed between sheets of release paper and molded in a hydraulic press as in the preparation of the sheet for Example 1. The damp "green" sheet was peeled from the release paper and placed on a stainless steel screen, and this combination was placed in a 60° C. water bath, remaining there for one hour. After removal from the water bath, the sheet was placed in a 60° C. convection oven for one hour. The sheet thus produced had a thickness of 0.94 mm and a density of 0.660 gram/cc. The permeability of this sheet was $2.8 \times 10^{-10}$ cm$^2$ and exhibited shrinkage of 7.6%. A similarly prepared microcrystalline cellulose/polyvinyl chloride sheet had been immersed in a 45 weight percent solution of potassium hydroxide for a period of 60 hours and exhibited a weight loss of only 0.17%.

We claim:

1. A sheet article of manufacture having a network of pores throughout formed from (1) a polymeric resinous matrix and (2) a particulate, releasably-binding, liquid-media insoluble, activated polysaccharide selected from the group consisting of agar, agarose, alginate, carrageenan, cellulose, chitosan, konjac, and mixtures thereof fixedly dispersed throughout said matrix, wherein said pores allow access to the activated polysaccharide.

2. The composition of claim 1 wherein the polymeric resin is a thermoplastic resin.

3. The composition of claim 1 wherein the activated polysaccharide contains ion exchange chromatography sites.

4. The composition of claim 1 wherein the activated polysaccharide contains affinity chromatography sites.

5. The composition of claim 1 wherein the activated polysaccharide contains sites capable of binding biological materials or organisms.

6. The composition of claim 1 wherein the polysaccharide is an activated cellulose, agarose, or mixtures thereof.

7. The composition of claim 6 wherein the polysaccharide is diethylaminoethyl cellulose.

8. The composition of claim 6 wherein the polysaccharide is cross-linked diethylaminoethyl agarose.

9. The composition of claim 1 wherein the weight ratio of activated polysaccharide to matrix comprises about 0.3:1 to 3:1.

10. The composition of claim 1 wherein the pores average about from 1 to 40 microns in diameter.

11. The composition of claim 1 wherein the pores average about from 10 to 30 microns in diameter.

12. The composition of claim 1 wherein the resinous matrix is formed from at least one polyvinyl chloride resin, polyvinyl chloride/monoethylenic monomer copolymer, polyolefin, polysulfone, latex, or water-insoluble cellulose ester.

13. The composition of claim 1 wherein the polysaccharide is at least one activated carrageenan, alginate, chitosan, or konjac.

14. The sheet of claim 1 adapted for use as a battery separator in separating electrodes in storage batteries.

15. A process for the preparation of a sheet according to claim 1 comprising:
   a. mixing:
      (i) a matrix-forming material which is a polymeric resin,
      (ii) a solvent or dispersant for said polymeric resin;
      (iii) a media-forming material which is a particulate, releasably-binding, carrier liquid insoluble, activated polysaccharide, and
      (iv) a volatile non-solvent pore former;
   b. extruding or molding the mixture to form a substantially flattened sheet;
   c. passing the flattened sheet through an extraction medium to replace the solvent in the sheet, when present, with the extraction medium; and
   d. removing the extraction medium and non-solvent pore former from the sheet.

16. The process of claim 15 wherein the matrix-forming material is a latex and said dispersant is water.

17. The process of claim 15 wherein the matrix-forming material is plasticized in said solvent.

18. The process of claim 17 wherein the weight ratio of solvent to resin comprises from 1:1 to 3:1.

19. The process of claim 15 wherein the weight ratio of media to matrix is about 0.3:1 to 3:1.

20. The process of claim 15 wherein the polysaccharide is an activated: agar, agarose, alginate, carrageenan, cellulose, chitosan, konjac, or a mixture thereof.

21. The process of claim 15 wherein the polymeric resin is at least one polyvinyl chloride resin, polyvinyl chloride/monoethylenic monomer copolymer, polyolefin, polysulfone, latex, or water-insoluble cellulose ester.

22. The process of claim 16 wherein the mixing is carried out in the added presence of an alkali metal carbonate.

* * * * *